Aug. 30, 1927.
C. KITLEY
DENTAL FLOSS HOLDER
Filed June 7, 1926
1,640,607
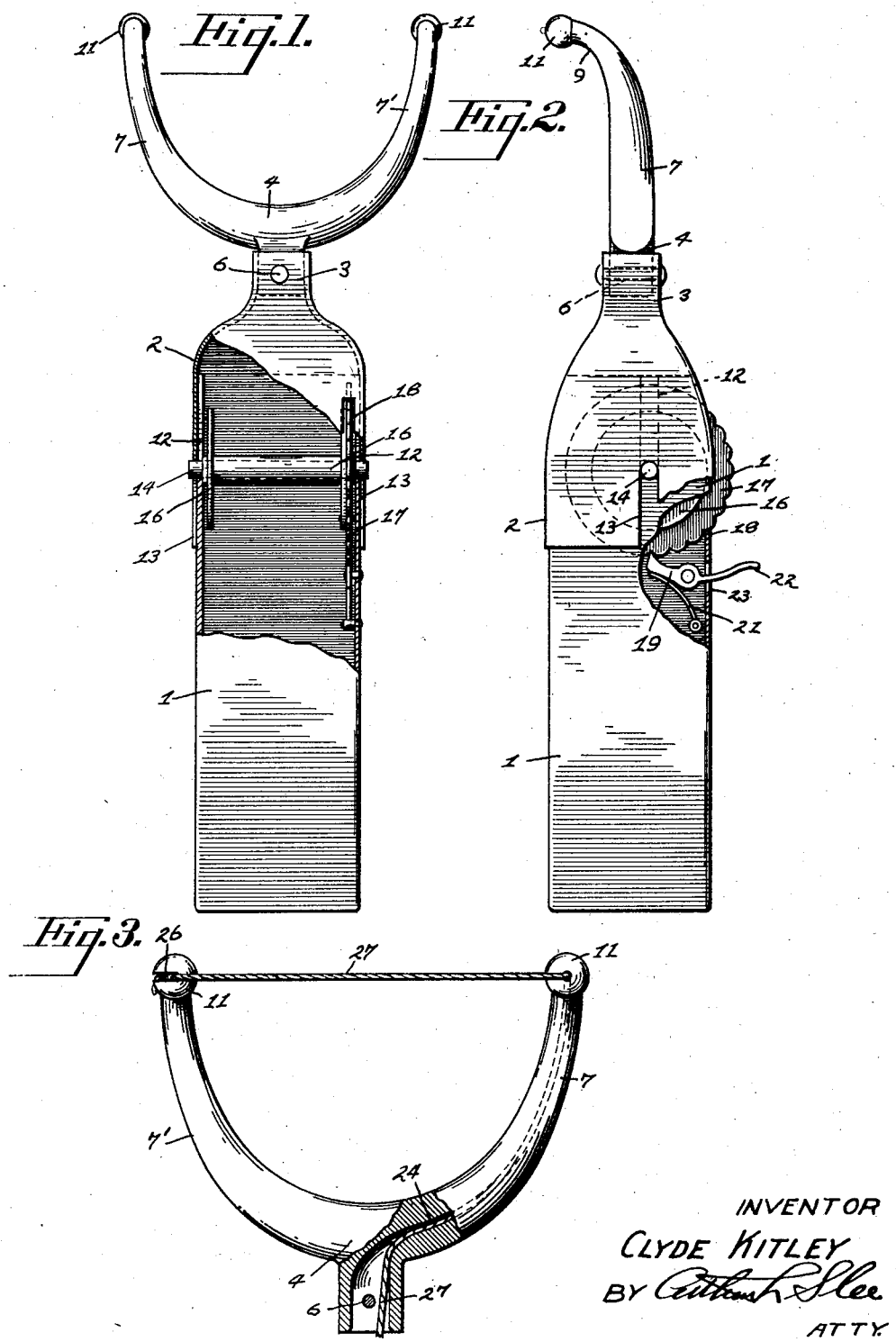
INVENTOR
CLYDE KITLEY
BY Arthur L. Slee
ATTY.

Patented Aug. 30, 1927.

1,640,607

UNITED STATES PATENT OFFICE.

CLYDE KITLEY, OF BERKELEY, CALIFORNIA.

DENTAL-FLOSS HOLDER.

Application filed June 7, 1926. Serial No. 114,180.

My invention relates to improvements in a holder for dental floss and the like whereby a strand of floss may be inserted and manipulated between the teeth of a user.

The primary object of my invention is to provide an improved holder for dental floss.

Another object is to provide an improved device whereby a strand of floss may be readily stretched taut and inserted between the teeth of a user for cleaning the adjacent surfaces of adjacent teeth.

A further object is to provide an improved device of the character described which will form convenient, efficient, and sanitary holder for dental floss.

Another object is to provide an improved holder which will facilitate the introduction and manipulation of a strand of floss between the teeth of a user.

A still further object is to provide an improved device of the character described which is simple and economical in construction and which is efficient in operation.

I accomplish these and other objects by means of the improved device disclosed in the drawings forming a part of the present specification wherein like characters of reference are used to designate similar parts throughout said specification and drawings and in which, Fig. 1 is a broken rear elevation of my improved dental floss holder;

Fig. 2 is a broken side elevation of the holder, and

Fig. 3 is a broken front elevation of the floss supporting prongs showing the manner in which a strand of floss is extended between the ends thereof, the figure being drawn upon an enlarged scale.

Referring to the drawings my improved holder will be seen to consist of a handle formed from telescopic sections 1 and 2 one end of which is reduced as at 3 to receive a member 4 secured thereon in any suitable manner as by a pin 6, said member being provided with a pair of diverging prongs 7 and 7' the ends of which are offset as at 9 and provided with nobs 11.

The telescoping portions of the handle sections 1 and 2 have oppositely disposed registering notches 12 and 13 formed therein respectively, said notches combining, when the sections are assembled, to form bearings engaging the ends of a shaft 14 extending across the handle and arranged to receive a spool 16 of dental floss or the like. A ratchet 17 is mounted within the handle upon one end of the shaft 1, said ratchet extending slightly outwardly through a slot 18 formed in one side of the handle. A pawl 19 is pivotally mounted within the handle adjacent the ratchet and normally held in engagement therewith by a suitable spring 21, said pawl being provided with an arm 22 extending outwardly through an opening 23 formed in the handle whereby the pawl may be moved to disengage the ratchet when desired.

One of the prongs 7 has a longitudinally disposed passage 24 formed therethrough, said passage opening through the base of the member 4 into the handle and opening outwardly through the end of said prong 7. The opposite prong 7' has a notch 26 formed upon the side remote from the prong 7, said notch being arranged to engage the end of a strand 27 of dental floss extended outwardly from the spool 16 through the prong 7 and across the end thereof to the prong 7'.

In operation, the spool 16 is inserted into the handle by separating the telescoping sections 1 and 2 and placing the spool onto the shaft 14, the shaft 14 then being placed in the notches of the section 1 and the section 2 moved onto the section 1 to engage and retain the shaft and spool. The strand of floss carried by the spool is threaded outwardly through the end of the section 2 and the passage 24.

When it is desired to use the floss, the free end of the strand 27 is drawn across the space between the ends of the prongs 7 and 7' and secured to the prong 7' in any convenient manner, preferably by forming a knot in the end of the strand to be engaged by the notch 26. After the end of the strand 27 has been secured to the end of the prong 7', the strand is drawn taut by rotating the ratchet manually to rewind any slack floss which may have been withdrawn from the spool 16, the outwardly extending edge of said ratchet being engaged and moved by means of the thumb of the user, or in other suitable manner. In rewinding such slack floss, the ratchet is arranged to move freely past the pawl 19. When the ratchet has been moved to tighten the strand 27, said ratchet is engaged and held by the pawl 19, thereby maintaining the strand in a taut condition extending across the ends of the prongs 7 and 7'. The prongs are then introduced into the mouth of the user and pressure applied by means of the handle to force the taut strand between the desired teeth and to manipulate the strand between said teeth to clean the adjacent surfaces in the well known manner.

To move a fresh portion of the strand 27 into operative position across the ends of the prongs 7 and 7', the pawl 19 is moved by means of the arm 22 to disengage the ratchet 17. The desired length of strand is drawn from the spool, the used portion of the strand being clipped off and the fresh end knotted and secured to the prong 7'.

The ends of the prongs 7 and 7' are offset near the ends, as best shown in Fig. 2 of the drawings, in such manner that the strand of dental floss carried thereby can be readily inserted between the teeth of the user. The nobs formed upon the ends of the prongs insures against injury to the lining of the mouth.

When not in use, the dental floss is fully enclosed and kept clean and sanitary. The prongs 7 may be readily sterilized in any convenient manner without injury to the holder and without damaging the dental floss in any manner.

The specific construction illustrated and described may of course be modified in numerous ways without departing from the spirit of the invention. I therefore do not wish to restrict myself to the specific details of construction above described, but desire to avail myself of all modifications which may fall within the scope of the appended claims.

Having thus described my invention what I claim as new and desire to secure by Letters Patent is:

1. A dental floss holder comprising a handle arranged to receive a spool of dental floss; a pair of prongs secured to the end of the handle, one of said prongs having a longitudinal passage extending therethrough to guide a strand of the floss from the spool to the end of said prong, and the other prong having means formed thereon for engaging the end of said strand; and means mounted within the handle for tightening the strand across the ends of the prongs whereby said strand may be inserted between the teeth of a user.

2. A dental floss holder comprising a handle formed in telescoping sections and arranged to receive a spool of dental floss; a pair of prongs secured upon one end of the handle and arranged to receive a strand of the floss extended across the ends thereof from the spool; and means mounted within the handle for tightening the strand across the ends of the prongs whereby said strand may be inserted between the teeth of a user.

3. A dental floss holder comprising a handle formed from a pair of telescoping sections having registering notches arranged to form bearings arranged to support a spool of dental floss within the handle; a pair of prongs secured upon one end of the handle and arranged to receive a strand of the floss extended across the ends thereof from the spool; and means mounted within the handle for tightening the strand across the ends of the prongs whereby said strand may be inserted between the teeth of a user.

4. A dental floss holder comprising a handle formed from a pair of telescoping sections having registering notches arranged to form bearings; a spool supporting shaft mounted within said bearings and arranged to receive a spool of dental floss; a pair of prongs secured upon one end of the handle and arranged to receive a strand of the floss extended across the ends thereof from the spool; and means mounted within the handle for tightening the strand across the ends of the prongs whereby said strand may be inserted between the teeth of a user.

5. A dental floss holder comprising a handle formed from a pair of telescoping sections having registering notches arranged to form bearings; a spool supporting shaft mounted within said bearings and arranged to receive a spool of dental floss; a pair of prongs secured upon one end of the handle and arranged to receive a strand of the floss extended across the ends of the prongs from the spool; and a ratchet mounted in connection with the shaft and engaging the spool for tightening the strand across the ends of the prongs whereby said strand may be inserted between the teeth of a user.

6. A dental floss holder comprising a handle formed from a pair of telescoping sections having registering notches formed therein and arranged to form bearings; a spool supporting shaft mounted in removable engagement with said bearings and arranged to receive a spool of dental floss; a pair of prongs secured upon one end of the handle and arranged to receive a strand of the floss extended across the ends of the prongs from the spool; a ratchet mounted in engagement with the shaft and the spool, and having one edge extending outwardly from a side of the handle whereby the spool may be rotated to tighten the strand across the ends of the prongs whereby said strand may be inserted between the teeth of a user; and a pawl mounted within the handle and normally engaging the ratchet to hold the strand in taut condition, said pawl being movable to disengage the ratchet whereby fresh portions of floss may be moved across the ends of the prongs.

In witness whereof I hereunto set my signature.

CLYDE KITLEY.